US 8,415,057 B2

(12) United States Patent
Oh et al.

(10) Patent No.: US 8,415,057 B2
(45) Date of Patent: Apr. 9, 2013

(54) ELECTROLYTIC SOLUTION FOR LITHIUM BATTERY, LITHIUM BATTERY COMPRISING THE SAME AND METHOD OF OPERATING THE LITHIUM BATTERY

(75) Inventors: Mi-Hyeun Oh, Yongin-si (KR); Jin-Sung Kim, Yongin-si (KR); Su-Hee Han, Yongin-si (KR); Jin-Hyunk Lim, Yongin-si (KR); Na-Rae Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 322 days.

(21) Appl. No.: 12/839,380

(22) Filed: Jul. 19, 2010

(65) Prior Publication Data

US 2011/0101924 A1  May 5, 2011

(30) Foreign Application Priority Data

Oct. 30, 2009  (KR) .................. 10-2009-0104304

(51) Int. Cl.
*H01M 6/16* (2006.01)
*H01M 6/04* (2006.01)
*H01M 4/00* (2006.01)

(52) U.S. Cl. .................. 429/339; 429/207; 429/223

(58) Field of Classification Search ............. 429/339, 429/207, 223
See application file for complete search history.

(56) References Cited

U.S. PATENT DOCUMENTS

| | | | |
|---|---|---|---|
| 6,503,657 B1 * | 1/2003 | Takami et al. | 429/188 |
| 2003/0129500 A1 * | 7/2003 | Gan et al. | 429/332 |
| 2006/0099511 A1 | 5/2006 | Fukushima et al. | |
| 2006/0134520 A1 * | 6/2006 | Ishii et al. | 429/223 |
| 2007/0026311 A1 | 2/2007 | Obana et al. | |
| 2007/0042274 A1 | 2/2007 | Muraoka et al. | |
| 2008/0213668 A1 | 9/2008 | Muraoka et al. | |
| 2008/0220336 A1 | 9/2008 | Mun et al. | |
| 2009/0305136 A1 | 12/2009 | Yada et al. | |

FOREIGN PATENT DOCUMENTS

| | | |
|---|---|---|
| EP | 2 221 903 A2 | 8/2010 |
| JP | 2005-251716 | 9/2005 |
| JP | 2007-52964 | 3/2007 |
| JP | 2007-128723 | 5/2007 |
| KR | 10-20000014375 A | 3/2000 |
| KR | 10-20050041513 A | 5/2005 |
| KR | 10-20060028121 A | 3/2006 |
| KR | 10-20070021040 A | 2/2007 |
| KR | 10-20070074963 A | 7/2007 |
| KR | 10-2008-0082276 A | 9/2008 |
| KR | 10-20090053467 A | 5/2009 |
| KR | 10-2009-0091053 A | 8/2009 |

OTHER PUBLICATIONS

KIPO Office Action dated May 31, 2011 for Korean priority patent application 10-2009-0104304, 7 pages.
Patent Abstract of Japan and English Machine translation of Japan Publication 2005-251716, 112 pages.

(Continued)

*Primary Examiner* — M'Baye Diao
(74) *Attorney, Agent, or Firm* — Christie, Parker & Hale, LLP

(57) ABSTRACT

An electrolytic solution for a lithium battery including a positive electrode having a nickel-cobalt-manganese based active material, the electrolytic solution including a nonaqueous organic solvent and a lithium salt, the nonaqueous organic solvent including ethylene carbonate and dimethyl carbonate, a lithium battery including the electrolytic solution, and a method of operating the lithium battery.

9 Claims, 4 Drawing Sheets

OTHER PUBLICATIONS

KIPO Registration Determination Certificate dated Jan. 12, 2012 for priority application KR 10-2009-0104304, 5 sheets.
European Search Report dated Feb. 11, 2011, for corresponding European Patent application 10188506.9.
Patent Abstracts of Japan, and English machine translation of Japanese Publication 2007-128723, 86 pages.
European Office action dated Jul. 30, 2012, for corresponding European Patent application 10188506.9, (4pages).

* cited by examiner

ELECTROLYTIC SOLUTION FOR LITHIUM BATTERY, LITHIUM BATTERY COMPRISING THE SAME AND METHOD OF OPERATING THE LITHIUM BATTERY

CROSS-REFERENCE TO RELATED APPLICATION

This application claims priority to and the benefit of Korean Patent Application No. 10-2009-0104304, filed in the Korean Intellectual Property Office on Oct. 30, 2009, the entire content of which is incorporated herein by reference.

BACKGROUND

1. Field

Aspects of embodiments of the present invention relate to an electrolytic solution and positive active material for a lithium battery.

2. Description of the Related Art

Generally, a lithium battery converts chemical energy generated by electrochemical redox reaction of chemical substances into electrical energy. A typical lithium battery includes a positive electrode, a negative electrode, and an electrolytic solution.

Newer electronic devices often require batteries having high capacity and high power output due to relatively higher performance. In order to manufacture a battery having high capacity, an active material having high capacity or a high charging voltage may be used. It is also desirable to increase stability of a lithium battery over long periods of time, so that a lithium battery will have improved lifetime characteristics.

SUMMARY

In embodiments of the present invention, a lithium battery includes an electrolytic solution and a positive electrode including a nickel (Ni)-cobalt (Co)-manganese (Mn)-based active material. In embodiments of the present invention, a lithium battery may have high capacity, long cycle life, and high stability even at high temperatures.

Embodiments of the present invention include a method of operating a lithium battery.

In embodiments of the present invention, a lithium battery includes a positive electrode having a a nickel (Ni)-cobalt (Co)-manganese (Mn)-based active material and an electrolytic solution including a nonaqueous organic solvent and a lithium salt. The nonaqueous organic solvent includes ethylene carbonate (EC) and dimethyl carbonate (DMC). The amount of ethylene carbonate (EC) may be equal to or less than 20 parts by volume based on 100 parts by volume of the nonaqueous organic solvent, and the amount of dimethyl carbonate (DMC) may be equal to or greater than 60 parts by volume based on 100 parts by volume of the nonaqueous organic solvent.

The Ni—Co—Mn-based active material may be represented by Formula 1 below:

$$Li_x(Ni_pCo_qMn_r)O_y \qquad \text{Formula 1}$$

wherein $0.95 \leq x \leq 1.05$, $0<p<1$, $0<q<1$, $0<r<1$, $p+q+r=1$, and $0<y \leq 2$.

In embodiments of the present invention, the Ni—Co—Mn-based active material may be represented by $LiNi_{0.5}Co_{0.2}Mn_{0.3}O_2$.

In embodiments of the present invention, the amount of ethylene carbonate (EC) may be in the range of about 10 parts by volume to about 20 parts by volume based on 100 parts by volume of the nonaqueous organic solvent.

In embodiments of the present invention, the amount of dimethyl carbonate (DMC) may be in the range of about 60 parts by volume to about 90 parts by volume based on 100 parts by volume of the nonaqueous organic solvent.

In embodiments of the present invention, the amount of ethylene carbonate (EC) may be in the range of about 10 parts by volume to about 20 parts by volume based on 100 parts by volume of the nonaqueous organic solvent and the amount of dimethyl carbonate (DMC) may be in the range of about 60 parts by volume to about 90 parts by volume based on 100 parts by volume of the nonaqueous organic solvent.

In embodiments of the present invention, the amount of ethylene carbonate (EC) may be in the range of about 10 parts by volume to about 20 parts by volume based on 100 parts by volume of the nonaqueous organic solvent and the amount of dimethyl carbonate (DMC) may be in the range of about 60 parts by volume to about 80 parts by volume based on 100 parts by volume of the nonaqueous organic solvent.

In embodiments of the present invention, the nonaqueous organic solvent may further include at least one first material selected from the group consisting of ethylmethyl carbonate (EMC) and diethyl carbonate (DEC).

In embodiments of the present invention, the amount of the first material may be equal to or less than 30 parts by volume based on 100 parts by volume of the nonaqueous organic solvent.

In embodiments of the present invention, a lithium battery includes: a positive electrode containing a nickel (Ni)-cobalt (Co)-manganese (Mn)-based active material; a negative electrode; and an electrolytic solution including a nonaqueous organic solvent and a lithium salt, the nonaqueous organic solvent including ethylene carbonate (EC) and dimethyl carbonate (DMC), the amount of ethylene carbonate (EC) being equal to or less than 20 parts by volume based on 100 parts by volume of the nonaqueous organic solvent, and the amount of dimethyl carbonate (DMC) being equal to or greater than 60 parts by volume based on 100 parts by volume of the nonaqueous organic solvent.

In embodiments of the present invention, a method of operating a lithium battery includes: providing a lithium battery including a positive electrode containing a nickel (Ni)-cobalt (Co)-manganese (Mn)-based active material, a negative electrode, and an electrolytic solution including a nonaqueous organic solvent and a lithium salt, the nonaqueous organic solvent including ethylene carbonate (EC) and dimethyl carbonate (DMC), the amount of ethylene carbonate (EC) being equal to or less than 20 parts by volume based on 100 parts by volume of the nonaqueous organic solvent, and the amount of dimethyl carbonate (DMC) being equal to or greater than 60 parts by volume based on 100 parts by volume of the nonaqueous organic solvent; and charging the lithium battery to have a charge cut-off voltage equal to or greater than 4.25 V.

BRIEF DESCRIPTION OF THE DRAWINGS

The above and other features and aspects of the present invention will become more apparent by reference to the following detailed description when considered in conjunction with the attached drawings in which.

DETAILED DESCRIPTION OF THE INVENTION

Figure 1:
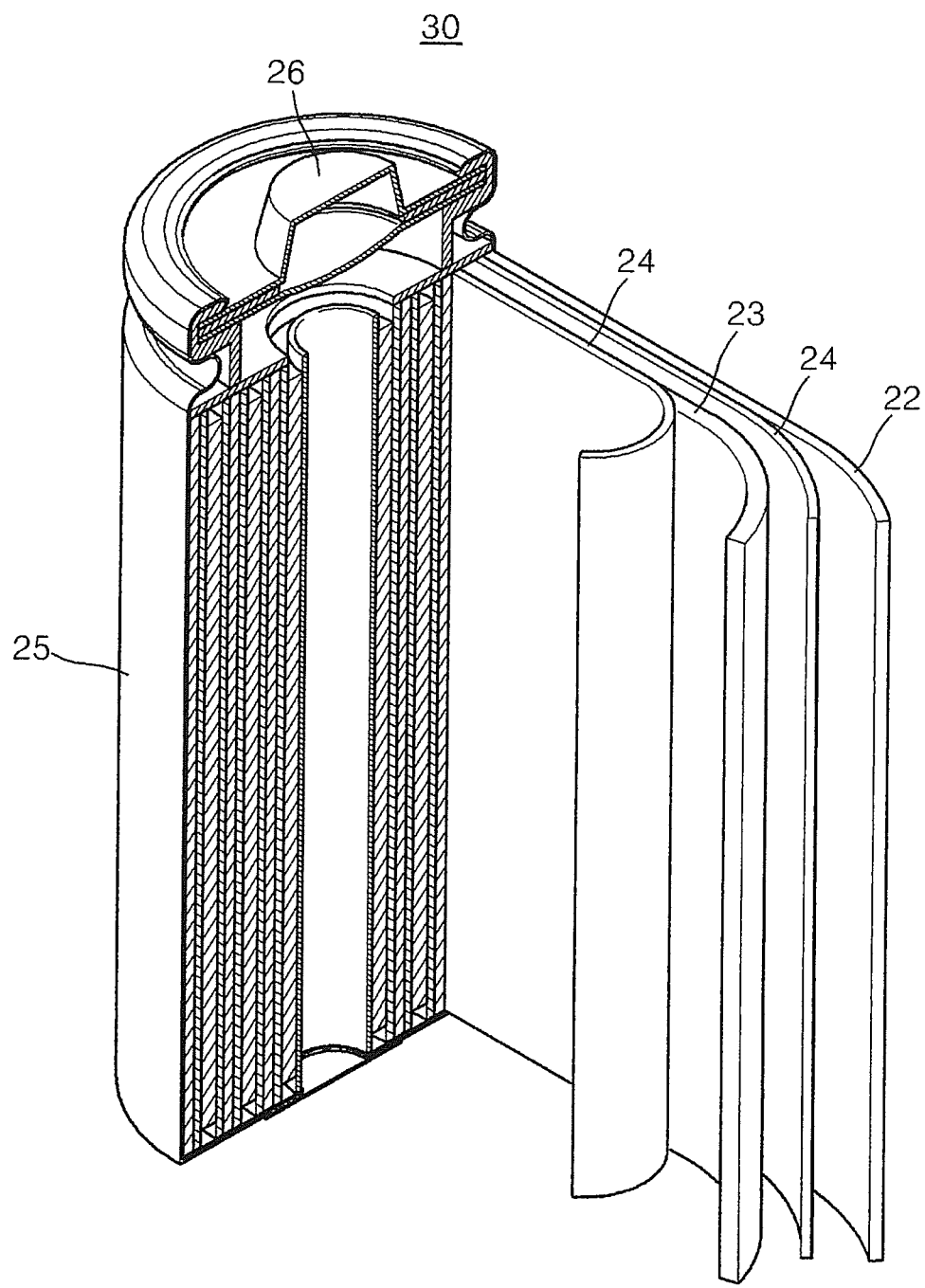
FIG. 1 is a schematic perspective view of a lithium battery according to an embodiment of the present invention.

Exemplary embodiments will now be described more fully with reference to the accompanying drawings. However, they may be embodied in different forms and should not be construed as being limited to the embodiments set forth herein. Rather, these embodiments are provided so that the disclosure is thorough and complete, and will fully convey the scope of the invention to those skilled in the art. In the drawings and the specification, like reference numerals refer to like elements.

An electrolytic solution for a lithium battery including a positive electrode containing a nickel (Ni)-cobalt (Co)-manganese (Mn)-based active material according to an embodiment of the present invention includes a nonaqueous organic solvent and a lithium salt. The nonaqueous organic solvent includes ethylene carbonate (EC) and dimethyl carbonate (DMC). The amount of ethylene carbonate (EC) is equal to or less than 20 parts by volume based on 100 parts by volume of the nonaqueous organic solvent and the amount of dimethyl carbonate (DMC) is equal to or greater than 60 parts by volume based on 100 parts by volume of the nonaqueous organic solvent.

The Ni—Co—Mn-based active material may be used in a lithium battery to assist in providing high capacity, long lifetime, and improved stability at high temperature. The Ni—Co—Mn-based active material may be represented by Formula 1 below:

$$Li_x(Ni_pCo_qMn_r)O_y.$$  Formula 1

In Formula 1, $0.95 \leq x \leq 1.05$, $0<p<1$, $0<q<1$, $0<r<1$, $p+q+r=1$, and $0<y\leq 2$.

For example, $0.97 \leq x \leq 1.03$, p may be 0.5, q may be 0.2, r may be 0.3, and y may be 2. However, any suitable Ni—Co—Mn-based active material according to Formula 1 may be used.

The Ni—Co—Mn-based active material may be $LiNi_{0.5}Co_{0.2}Mn_{0.3}O_2$. However, any suitable Ni—Co—Mn-based active material according to Formula 1 may be used.

In order to improve the capacity of a lithium battery including a positive electrode containing a Ni—Co—Mn-based active material, a large amount of Li ions may be used by charging the lithium battery with a high voltage, i.e., equal to or greater than 4.25 V. However, generally, when a lithium battery is charged to a high voltage, a large amount of Li ions move to the negative electrode, and thus, deterioration of the negative electrode plate is accelerated. Accordingly, capacity retention rate may be reduced and the capacity may significantly decline at a relatively early stage of operating the battery (for example, at less than 100 cycles). However, in the lithium battery including a positive electrode containing a Ni—Co—Mn-based active material, and an electrolytic solution including a nonaqueous organic solvent containing EC and DMC in the amounts described above, even when the lithium battery is charged to a high voltage, the capacity retention rate is improved (in part, due to low viscosity and high conductivity of the electrolytic solution) and the time at which the capacity sharply declines may be delayed (for example, after 100 cycles or more).

Thus, in the lithium battery including a positive electrode containing a Ni—Co—Mn-based active material and the electrolytic solution described above, high voltage charging may be used to attain high capacity, the capacity retention rate may be improved, and the time at which the capacity sharply declines may be delayed.

The nonaqueous organic solvent contained in the electrolytic solution may function as a migration medium of Li ions involved in electrochemical reactions of the lithium battery. In embodiments of the present invention, a lithium battery contains a nonaqueous organic solvent including EC and DMC.

The amount of EC may be a positive amount equal to or less than 20 parts by volume based on 100 parts by volume of the nonaqueous organic solvent. In embodiments of the present invention, the amount of EC may be in the range of about 10 parts by volume to about 20 parts by volume based on 100 parts by volume of the nonaqueous organic solvent. For example, the amount of EC may be 10 parts by volume or 20 parts by volume based on 100 parts by volume of the nonaqueous organic solvent. However, any suitable amount of EC may be used.

The amount of DMC may be equal to or greater than 60 parts by volume based on 100 parts by volume of the nonaqueous organic solvent. In embodiments of the present invention, the amount of DMC may be in the range of about 60 parts by volume to about 90 parts by volume based on 100 parts by volume of the nonaqueous organic solvent. In other embodiments, the amount of DMC may be in the range of about 60 parts by volume to about 80 parts by volume based on 100 parts by volume of the nonaqueous organic solvent. In other embodiments, the amount of DMC may be in the range of about 60 parts by volume to about 70 parts by volume or in the range of about 70 parts by volume to about 80 parts by volume based on 100 parts by volume of the nonaqueous organic solvent, but is not limited thereto. For example, the amount of DMC may be 60 parts by volume, 70 parts by volume, or 80 parts by volume based on 100 parts by volume of the nonaqueous organic solvent. However, any suitable amount of DMC may be used.

According to an embodiment of the present invention, the amount of EC may be in the range of about 10 parts by volume to about 20 parts by volume based on 100 parts by volume of the nonaqueous organic solvent, and the amount of DMC may be in the range of about 60 parts by volume to about 90 parts by volume based on 100 parts by volume of the nonaqueous organic solvent.

According to another embodiment of the present invention, the amount of EC may be in the range of about 10 parts by volume to about 20 parts by volume based on 100 parts by volume of the nonaqueous organic solvent, and the amount of DMC may be in the range of about 60 parts by volume to about 80 parts by volume based on 100 parts by volume of the nonaqueous organic solvent.

According to another embodiment of the present invention, the amount of EC may be 10 parts by volume or 20 parts by volume based on 100 parts by volume of the nonaqueous organic solvent, and the amount of DMC may be 60 parts by volume, 70 parts by volume, or 80 parts by volume based on 100 parts by volume of the nonaqueous organic solvent.

If the amounts of EC and DMC are within the ranges described above, lifetime performance may be improved and the time at which the capacity sharply declines may be delayed even though the lithium battery including a positive electrode containing a Ni—Co—Mn-based active material and the electrolytic solution is charged at high voltage (for example, a voltage equal to or greater than 4.25 V).

The nonaqueous organic solvent may further include at least one first material selected from a carbonate-based solvent, an ester-based solvent, an ether-based solvent, a ketone-based solvent, an alcohol-based solvent, and an aprotic solvent. Combinations of first materials may be used.

The carbonate-based solvent may be diethyl carbonate (DEC), dipropyl carbonate (DPC), methylpropyl carbonate (MPC), ethylpropyl carbonate (EPC), ethylmethyl carbonate (EMC), propylene carbonate (PC), or the like. However, any suitable carbonate-based solvent may be used.

The ester-based solvent may be methyl acetate, ethyl acetate, n-propyl acetate, dimethyl acetate, methyl propionate, ethyl propionate, γ-butylolactone, decanolide, valerolactone, mevalonolactone, caprolactone, or the like. However, any suitable ester-based solvent may be used.

The ether-based solvent may be dibutyl ether, tetraglyme, diglyme, dimethoxy ethane, 2-methyltetrahydrofuran, tetrahydrofuran, or the like. However, any suitable ether-based solvent may be used.

The ketone-based solvent may be cyclohexanone. However, any suitable ketone-based solvent may be used.

The alcohol-based solvent may be ethyl alcohol, isopropyl alcohol, or the like. However, any suitable alcohol-based solvent may be used.

The aprotic solvent may be a nitrile such as R—CN (where R is a $C_2$-$C_{20}$ linear, branched, or cyclic hydrocarbon-based moiety which may include an double bonded aromatic ring or an ether bond), an amide such as dimethylformamide, a dioxolane such as 1,3-dioxolane, a sulfolane, or the like. However, any suitable aprotic solvent may be used.

For example, in embodiments of the present invention, the nonaqueous organic solvent may include at least one first material selected from ethylmethyl carbonate (EMC) and diethyl carbonate (DEC).

If the first material is included in the nonaqueous organic solvent, the amount of the first material may be equal to or less than 30 parts by volume based on 100 parts by volume of the nonaqueous organic solvent. For example, the amount of the first material may be equal to or less than 20 parts by volume or equal to or less than 10 parts by volume based on 100 parts by volume of the nonaqueous organic solvent. However, any suitable amount of the first material may be used. The lowest amount of the first material may be determined according to the amounts of EC and DMC.

For example, the nonaqueous organic solvent may be a mixture of EC and DMC without the first material. Or, in other embodiments, the nonaqueous organic solvent may be a mixture of EC, DMC, and the first material. In this regard, the first material may be selected from EMC and DEC, and the amount of the first material may be equal to or less than 30 parts by volume based on 100 parts by volume of the nonaqueous organic solvent.

The lithium salt contained in the electrolytic solution is dissolved in the nonaqueous organic solvent and functions as a source of lithium ions in the lithium battery and accelerates the migration of lithium ions between the positive electrode and the negative electrode.

In embodiments of the present invention, the lithium salt may include at least one supporting electrolyte salt selected from $LiPF_6$, $LiBF_4$, $LiSbF_6$, $LiAsF_6$, LiN $(SO_2C_2F_5)_2$, Li $(CF_3SO_2)_2N$, $LiC_4F_9SO_3$, $LiClO_4$, $LiAlO_2$, $LiAlCl_4$, LIN $(C_xF_{2x+1}SO_2)(C_yF_{2y+1}SO_2)$ (where x and y are each independently a natural number), LiCl, LiI, and $LiB(C_2O_4)_2$ (lithium bis(oxalato) borate or LiBOB). Combinations of electrolyte salts may be used.

The concentration of the lithium salt may be in the range of about 0.1 M to about 2.0 M, for example, in the range of about 0.6 M to about 2.0 M. If the concentration of the lithium salt is within the range described above, the electrolytic solution may have the desired conductivity and viscosity, and thus lithium ions may efficiently migrate.

The electrolytic solution may further include an additive capable of improving low temperature performance of the lithium battery and swelling performance of the lithium battery at high temperature. The additive may be a carbonate-based material. One additive may be used, or combinations of additives may be used.

For example, the carbonate-based material may be vinylene carbonate (VC); vinylene carbonate (VC) derivatives having at least one substituent selected from a halogen atom (for example, —F, —Cl, —Br, and —I), a cyano group (CN), and a nitro group ($NO_2$); and ethylene carbonate (EC) derivatives having at least one substituent selected from a halogen atom (for example, —F, —Cl, —Br, and —I), a cyano group (CN), and a nitro group ($NO_2$). However, any suitable carbonate-based material may be used.

The electrolytic solution may further include at least one additive selected from vinylene carbonate (VC) and fluoroethylene carbonate (FEC). For example, the electrolytic solution may include FEC as an additive. Or, in other embodiments, the electrolytic solution may include both vinylene carbonate and fluoroethylene carbonate as additives.

The amount of the additive (or additives) may be in the range of about 0.1 parts by weight to about 10 parts by weight based on 100 parts by weight of a total amount of the nonaqueous organic solvent and the lithium salt. If the amount of the additive is within the range described above, low temperature performance of the lithium battery may be improved, swelling characteristics of the lithium battery at high temperatures may be improved, and lifetime performance may be improved, even though the lithium battery including a positive electrode containing a Ni—Co—Mn-based active material is charged at high voltage (for example, a voltage equal to or greater than 4.25 V).

For example, the amount of the additive may be in the range of about 1 part by weight to about 5 parts by weight, or in the range of about 3 parts by weight to about 4 parts by weight, based on 100 parts by weight of the total amount of the nonaqueous organic solvent and the lithium salt but is not limited thereto.

A lithium battery according to another aspect of the present invention includes: a positive electrode containing a nickel (Ni)-cobalt (Co)-manganese (Mn)-based active material; a negative electrode; and an electrolytic solution, the electrolytic solution including a nonaqueous organic solvent and a lithium salt. The nonaqueous organic solvent includes ethylene carbonate (EC) and dimethyl carbonate (DMC). The amount of EC is equal to or less than 20 parts by volume based on 100 parts by volume of the nonaqueous organic solvent, and the amount of DMC is equal to or greater than 60 parts by volume based on 100 parts by volume of the nonaqueous organic solvent. The electrolytic solution is described in more detail above.

The type of the lithium battery is not particularly limited, and may be, for example, a lithium secondary battery such as a lithium ion battery, a lithium ion polymer battery, a lithium sulfur battery, or the like, or a lithium primary battery.

The positive electrode may include a current collector and a positive active material layer disposed on the current collector. The positive electrode may be prepared according to the following process. A positive active material, a binder, and a solvent are mixed to prepare a positive active material-containing composition. Then, the positive active material-containing composition is directly coated on a current collector (for example, an aluminum (Al) current collector) and dried to form a positive active material layer, thereby preparing a positive electrode plate. Alternatively, the positive active material-containing composition is cast on a separate support, and a film separated therefrom, forming a positive active material layer, and the layer is then laminated on the current collector to prepare a positive electrode plate. The method of preparing the positive electrode is obvious to those of ordinary skill in the art, and thus a detailed description thereof will not be provided. The solvent may be N-methylpyrrolidone, acetone, water, or the like. However, any suitable solvent may be used.

The positive active material for forming the positive active material layer contains the Ni—Co—Mn-based active material described above. The Ni—Co—Mn-based active material may be represented by Formula 1. For example, the Ni—Co—Mn-based active material may be $LiNi_{0.5}Co_{0.2}Mn_{0.3}O_2$. However, any Ni—Co—Mn compound according to Formula 1 may be used.

The positive active material may include the Ni—Co—Mn-based active material alone, or the positive active material may be a mixture of the Ni—Co—Mn-based active material and at least one first positive active material.

A compound (lithiated intercalation compound) which allows reversible intercalation and deintercalation of lithium may be used as the first positive active material. Examples of the first positive active material may include compounds represented by any one of the following formulae. However, any suitable lithiated intercalation compound may be used.

$Li_aA_{1-b}X_bD_2$ (where $0.95 \leq a \leq 1.1$ and $0 \leq b \leq 0.5$); $Li_aE_{1-b}X_bO_{2-c}D_c$ (where $0.95 \leq a \leq 1.1$, $0 \leq b \leq 0.5$, and $0 \leq c \leq 0.05$); $LiE_{2-b}X_bO_{4-c}D_c$ (where $0 \leq b \leq 0.5$ and $0 \leq c \leq 0.05$); $Li_aNi_{1-b-c}Co_bB_cD_\alpha$ (where $0.95 \leq a \leq 1.1$, $0 \leq b \leq 0.5$, $0 \leq c \leq 0.05$, and $0 \leq \alpha \leq 2$); $Li_aNi_{1-b-c}Co_bX_cO_{2-\alpha}M_\alpha$ (where $0.95 \leq a \leq 1.1$, $0 \leq b \leq 0.5$, $0 \leq c \leq 0.05$, and $0 < \alpha < 2$); $Li_aNi_{1-b-c}Co_bX_cO_{2-\alpha}M_2$ (where $0.95 \leq a \leq 1.1$, $0 \leq b \leq 0.5$, $0 \leq c \leq 0.05$, and $0 < \alpha < 2$); $Li_aNi_{1-b-c}Mn_bX_cD_\alpha$ (where $0.95 \leq a \leq 1.1$, $0 \leq b \leq 0.5$, $0 \leq c \leq 0.05$, and $0 < \alpha \leq 2$); $Li_aNi_{1-b-c}Mn_bX_cO_{2-\alpha}M_\alpha$ (where $0.95 \leq a \leq 1.1$, $0 \leq b \leq 0.5$, $0 \leq c \leq 0.05$, and $0 < \alpha < 2$); $Li_aNi_{1-b-c}Mn_bX_cO_{2-\alpha}M_2$ (where $0.95 \leq a \leq 1.1$, $0 \leq b \leq 0.5$, $0 \leq c \leq 0.05$, and $0 < \alpha < 2$); $Li_aNi_bE_cG_dO_2$ (where $0.90 \leq a \leq 1.1$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.1$ and $0.001 \leq b \leq 0.1$); $Li_aCoG_bO_2$ (where $0.90 \leq a \leq 1.1$ and $0.001 \leq b \leq 0.1$); $Li_aMnG_bO_2$ (where $0.90 \leq a \leq 1.1$ and $0.001 \leq b \leq 0.1$); $Li_aMn_2G_bO_4$ (where $0.90 \leq a \leq 1.1$ and $0.001 \leq b \leq 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A is selected from nickel (Ni), cobalt (Co), manganese (Mn), and combinations thereof; X is selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from oxygen (O), fluorine (F), sulfur (S), phosphorus (P), and combinations thereof; E is selected from cobalt (Co), manganese (Mn), and combinations thereof; M is selected from fluorine (F), sulfur (S), phosphorus (P), and combinations thereof; G is selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; Z is selected from chromium (Cr), vanadium (V), iron (Fe), scandium (Sc), yttrium (Y), and combinations thereof; and J is selected from vanadium (V), chromium (Cr), manganese (Mn), cobalt (Co), nickel (Ni), copper (Co), and combinations thereof.

A surface coating layer may be formed on these compounds. Alternatively, a mixture of the compounds without individually having a coating layer, but rather, the mixture having a coating layer thereon may be used. The coating layer may include at least one compound of a coating element selected from oxides, hydroxides, oxyhydroxides, oxycarbonates, and hydroxycarbonates of the coating element. The compounds for the coating layer may be amorphous or crystalline. The coating element contained in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof.

The coating layer may be formed using any method that does not adversely affect the physical properties of the positive active material when a compound of such a coating element is used. For example, the coating layer may be formed using a spray coating method, a dipping method, or the like. This is obvious to those of ordinary skill in the art, and thus a detailed description thereof will not be provided.

If the positive active material is a mixture of the Ni—Co—Mn-based active material and the first positive active material, the ratio of the Ni—Co—Mn-based active material and the first positive active material may vary according to the desired performance of the lithium battery.

According to an embodiment of the present invention, the positive active material contained in the positive active material layer may include only the Ni—Co—Mn-based active material, i.e., it may not include a first positive active material.

According to another embodiment, the positive active material contained in the positive active material layer may be a mixture of the Ni—Co—Mn-based active material and the first positive active material, wherein the first positive active material may be $LiCoO_2$. The Ni—Co—Mn-based active material and the first positive active material may be mixed in a weight ratio of 3:7. However, any suitable weight ratio may be used.

The binder contained in the positive active material layer functions to bind positive active material particles together and to the current collector. Examples of the binder include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer having ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon. A single binder or combinations of binders may be used.

The positive active material layer may further include a conductive agent. The conductive agent is used to provide conductivity to the positive electrode. Any conductive material inducing no chemical change in batteries may be used. Examples of the conductive agent may include conductive materials including carbonaceous materials such as natural graphite, artificial graphite, carbon black, acetylene black, ketchen black, carbon fibers, and the like; metal-based materials such as copper (Cu), nickel (Ni), aluminum (Al), silver (Ag), and the like, in powder or fiber form; conductive polymers, such as a polyphenylene derivative; and mixtures thereof.

The current collector may be aluminum (Al). However, any suitable material may be used for the current collector.

Similarly, a negative active material, a conductive agent, a binder, and a solvent are mixed to prepare a negative active material-containing composition. The negative active material-containing composition is directly coated on a current collector (for example, a Cu current collector), or is cast on a separate support and a negative active material film separated therefrom is laminated on a Cu current collector to obtain an negative electrode plate. In this regard, the amounts of the negative active material, the conductive agent, the binder, and the solvent may be those commonly used in a lithium battery.

Natural graphite, artificial graphite, a silicon/carbon complex ($SiO_x$), silicon metal, a silicon thin film, lithium metal, a lithium alloy, a carbonaceous material, or graphite may be used as the negative active material. The conductive agent, the binder, and the solvent in the negative active material-containing composition may be the same as those in the positive active material-containing composition. If desired, a plasticizer may be further added to the positive active material-containing composition and the negative active material-containing composition to produce pores inside the electrode plates.

A separator may be interposed between the positive electrode and the negative electrode according to the type of the lithium battery. Any separator that is commonly used for lithium batteries may be used. In an embodiment, the separator may have low resistance to migration of ions in an electrolyte and have high electrolyte-retaining ability. Examples of materials used to form the separator include glass fiber, polyester, Teflon, polyethylene, polypropylene, polytetrafluoroethylene (PTFE), and combinations thereof, each of which may be a nonwoven fabric or a woven fabric. A windable separator formed of a material such as polyethylene and polypropylene may be used for a lithium ion battery. A separator that may retain a large amount of an organic electrolytic solution may be used for a lithium ion polymer battery. These separators may be prepared according to the following process.

A polymer resin, a filler, and a solvent are mixed to prepare a composition for forming a separator. Then, the composition may be directly coated on an electrode, and then dried to form a separator film. Alternatively, the composition may be cast on a separate support and then dried to form a separator film, and the separator film separated from the support may be laminated on an electrode.

The polymer resin may be any material that is commonly used as a binder for an electrode plate. Examples of the polymer resin include a vinylidenefluoride/hexafluoropropylene copolymer, polyvinylidenefluoride, polyacrylonitrile, polymethylmethacrylate, and mixtures thereof. For example, a vinylidenefluoride/hexafluoropropylene copolymer having about 8 to about 25 wt % of hexafluoropropylene may be used.

The separator may be interposed between the positive electrode plate and the negative electrode plate to form an electrode assembly. The electrode assembly is wound or folded and then sealed in a cylindrical or rectangular battery case. Then, an electrolytic solution according to an embodiment of the present invention is injected into the battery case to complete the manufacture of a lithium ion battery. Alternatively, a plurality of electrode assemblies may be stacked in a multi-cell structure (such as a bi-cell) and impregnated with an electrolytic solution according to an embodiment of the present invention. The resultant multi-cell structure is put into a pouch and sealed, thereby completing the manufacture of a lithium ion polymer battery.

FIG. 1 is a schematic perspective view of a lithium battery 30 according to an embodiment of the present invention. Referring to FIG. 1, the lithium battery 30 according to the current embodiment includes a positive electrode 23, a negative electrode 22, a separator 24 interposed between the positive electrode 23 and the negative electrode 22, an electrolytic solution (not shown) impregnated into the positive electrode 23, the negative electrode 22, and the separator 24, a battery case 25, and a sealing member 26 sealing the battery case 25. The lithium battery 30 is manufactured by sequentially stacking the positive electrode 23, the negative electrode 22, and the separator 24 upon one another, winding the stack in a spiral form, and inserting the wound stack into the battery case 25.

The amount of a target element contained in the electrolytic solution of the lithium battery to be analyzed (for example, ethylene carbonate (EC) and dimethyl carbonate (DMC)) using gas chromatography (GC).

In this regard, quantitative analysis of the target element may be performed using an internal standard method (ISTD) and/or an external standard method (ESTD).

According to the ISTD, the quantitative analysis may be performed using ethyl acetate (EA) as an internal standard. According to the ESTD, the quantitative analysis may be performed using at least two standards per concentration for the target element to be analyzed (for example, EC and DMC).

For example, a method of quantitatively analyzing the target element (for example, EC and DMC contained in the electrolytic solution of the lithium battery) may include: extracting the electrolytic solution from the lithium battery; performing GC analysis on the extracted electrolytic solution by using ISTD and/or ESTD to collect data of the target element; and calculating the amount (for example, % by volume) of the target element from the data. However, any suitable method may be used.

Details of a standard GC analysis are disclosed in "Principles of Instrumental Analysis", $5^{th}$ edition, Douglas A. Skoog, et al., pp. 701-722, which is incorporated herein by reference.

Since the lithium battery according to the current embodiment includes the positive electrode containing a Ni—Co—Mn-based active material and the electrolytic solution described above, lifetime performance may be improved and the time at which the capacity sharply declines may be delayed even when the lithium battery is charged at a high voltage of 4.25 V or greater. In some embodiments, the lifetime performance may be improved and the time at which the capacity sharply declines may be delayed when the lithium battery is charged at a voltage of 4.3 V or greater. In some embodiments, the lifetime performance may be improved and the time at which the capacity sharply declines may be delayed when the lithium battery is charged at a voltage of 4.4 V or greater. In some embodiments, the lifetime performance may be improved and the time at which the capacity sharply declines may be delayed when the lithium battery is charged at a voltage of 4.5 V or greater Thus, in the lithium battery, high capacity may be obtained, lifetime performance may be improved, and the time at which the capacity sharply declines may be delayed.

Thus, the final charge voltage of the lithium battery may be equal to or greater than 4.25 V. In some embodiments, the final charge voltage of the lithium battery may be equal to or greater than 4.3 V. In some embodiments, the final charge voltage of the lithium battery may be equal to or greater than 4.4 V. In some embodiments, the final charge voltage of the lithium battery may be equal to or greater than 4.5 V.

A method of operating a lithium battery according to another aspect of the present invention includes: providing the lithium battery described above; and charging the lithium battery so that the lithium battery has a final charge voltage equal to or greater than 4.25 V. According to the method of operating the lithium battery, the lifetime performance may be improved and the time at which the capacity sharply declines may be delayed, even though the lithium battery is charged to have a final charge voltage of 4.25 V greater.

Hereinafter, one or more embodiments of the present invention will be described in more detail with reference to the following examples. However, these examples are not intended to limit the scope of the one or more embodiments of the present invention.

EXAMPLES

Comparative Example 1

Artificial graphite, as a negative active material, and polyvinylidene fluoride (PVDF), as a binder, were mixed in a weight ratio of 96:4 in N-methylpyrrolidone, as a solvent, to prepare a negative active material-containing composition. The negative active material-containing composition was coated on a copper (Cu)-foil to form a thin negative electrode plate having a thickness of 14 μm. The plate was then dried at 135° C. for 3 hours or longer, and pressed to manufacture a negative electrode.

$LiNi_{0.5}Co_{0.2}Mn_{0.3}O_2$, as a positive active material, PVDF, as a binder, and carbon, as a conductive agent, were dispersed in a weight ratio of 96:2:2 in N-methylpyrrolidone, as a solvent, to prepare a positive active material-containing composition. The positive active material-containing composition was coated on an aluminum (Al)-foil to form a thin positive electrode plate having a thickness of 60 μm. The plate was then dried at 135° C. for 3 hours or longer, and pressed to manufacture a positive electrode.

An electrolytic solution was prepared by mixing a nonaqueous organic solvent. The nonaqueous organic solvent included a mixture of ethylene carbonate (EC), ethylmethyl carbonate (EMC), and dimethyl carbonate (DMC) in a volume ratio of 50:20:30 and 1.4 M $LiPF_6$.

The negative electrode, the positive electrode, and a porous polyethylene (PE) film, as a separator were wound, pressed, and placed into a battery case. Then, the electrolytic solution was injected into the battery case to manufacture a lithium battery having a capacity of 2,600 mAh.

Comparative Example 2

A lithium battery was manufactured in the same manner as in Comparative Example 1, except that the volume ratio of EC, EMC, and DMC was adjusted to 40:20:40.

Comparative Example 3

A lithium battery was manufactured in the same manner as in Comparative Example 1, except that the volume ratio of EC, EMC, and DMC was adjusted to 30:20:50.

Comparative Example 4

A lithium battery was manufactured in the same manner as in Comparative Example 1, except that the volume ratio of EC, EMC, and DMC was adjusted to 10:90:0 (that is, DMC was not included in the nonaqueous organic solvent).

Comparative Example 5

A lithium battery was manufactured in the same manner as in Comparative Example 1, except that the volume ratio of EC, EMC, and DMC was adjusted to 10:60:30.

Comparative Example 6

A lithium battery was manufactured in the same manner as in Comparative Example 1, except that the volume ratio of EC, EMC, and DMC was adjusted to 10:40:50.

Comparative Example 7

A lithium battery was manufactured in the same manner as in Comparative Example 1, except that the volume ratio of EC, EMC, and DMC was adjusted to 20:40:40.

Comparative Example 8

A lithium battery was manufactured in the same manner as in Comparative Example 1, except that the volume ratio of EC, EMC, and DMC was adjusted to 20:60:20.

Comparative Example 9

A lithium battery was manufactured in the same manner as in Comparative Example 1, except that the volume ratio of EC, EMC, and DMC was adjusted to 20:80:0 (that is, DMC was not included in the nonaqueous organic solvent).

Comparative Example 10

A lithium battery was manufactured in the same manner as in Comparative Example 1, except that the volume ratio of EC, EMC, and DMC was adjusted to 10:50:40.

Comparative Example 11

A lithium battery was manufactured in the same manner as in Comparative Example 1, except that the volume ratio of EC, EMC, and DMC was adjusted to 10:70:20.

Comparative Example 12

A lithium battery was manufactured in the same manner as in Comparative Example 1, except that the nonaqueous organic solvent was obtained by mixing ethylene carbonate (EC), ethylmethyl carbonate (EMC), and diethyl carbonate (DEC) in a volume ratio of 20:20:60. In other words, a mixture of EC, EMC, and DEC was used instead of a mixture of EC, EMC, and DMC.

Comparative Example 13

A lithium battery was manufactured in the same manner as in Comparative Example 12, except that the volume ratio of EC, EMC, and DEC was adjusted to 20:40:40.

Comparative Example 14

A lithium battery was manufactured in the same manner as in Comparative Example 12, except that a volume ratio of EC, EMC, and DEC was adjusted to 20:60:20.

Comparative Example 15

A lithium battery was manufactured in the same manner as in Comparative Example 12, except that the nonaqueous organic solvent was obtained by mixing EC, DMC, and DEC in a volume ratio of 20:20:60. In other words, a mixture of EC, DMC, and DEC was used instead of the mixture of EC, EMC, and DEC.

Comparative Example 16

A lithium battery was manufactured in the same manner as in Comparative Example 15, except that the volume ratio of EC, DMC, and DEC was adjusted to 20:40:40.

Example 1

A lithium battery was manufactured in the same manner as in Comparative Example 1, except that the volume ratio of EC, EMC, and DMC was adjusted to 20:0:80 (that is, EMC was not included in the nonaqueous organic solvent).

Example 2

A lithium battery was manufactured in the same manner as in Comparative Example 1, except that the volume ratio of EC, EMC, and DMC was adjusted to 20:20:60.

Example 3

A lithium battery was manufactured in the same manner as in Comparative Example 1, except that the volume ratio of EC, EMC, and DMC was adjusted to 10:20:70.

Example 4

A lithium battery was manufactured in the same manner as in Comparative Example 1, except that the volume ratio of EC, EMC, and DMC was adjusted to 10:10:80.

Example 5

A lithium battery was manufactured in the same manner as in Comparative Example 1, except that the volume ratio of EC, EMC, and DMC was adjusted to 10:30:60.

Example 6

A lithium battery was manufactured in the same manner as in Comparative Example 14, except that DMC was used instead of EMC. In other words, the electrolyte included EC, DMC, and DEC at a volume ratio of 20:60:20.

Evaluation Example

The lithium batteries manufactured according to Comparative Examples 1 and 16 and Examples 1 and 6 were charged at a constant current (CC) of 520 mA and a constant voltage (CV) of 4.3V to a cut-off current of 20 mA. Then, the batteries were discharged at a current of 520 mA to a cut-off voltage of 2.75V. The lithium batteries were subjected to a formation process by repeating the charge and discharge processes 3 times.

Once the lithium batteries according to Comparative Examples 1 through 16 and Examples 1 through 6 had undergone the formation process, they were subjected to one cycle of charging and discharging at room temperature (about 25° C.), i.e., charging at a CC of 2,080 mA and a CV of 4.3 V to a cut-off of 100 mA, and discharging at a current of 2,600 mA to a cut-off voltage of 3 V. Then, initial capacities of the batteries were measured. Battery capacities were also measured after 100 cycles of the charging and the discharging. The time at which the capacity sharply declined was also measured. The capacity retention rate after 100 cycles with respect to the initial capacity, i.e., (capacity after 100 cycles/initial capacity)×100(%), and the capacity retention rate after 100 cycles with respect to 2600 mAh, i.e., (capacity after 100 cycles/2600 mAh)×100(%) were measured to evaluate room temperature lifetime performance.

Figure 2:
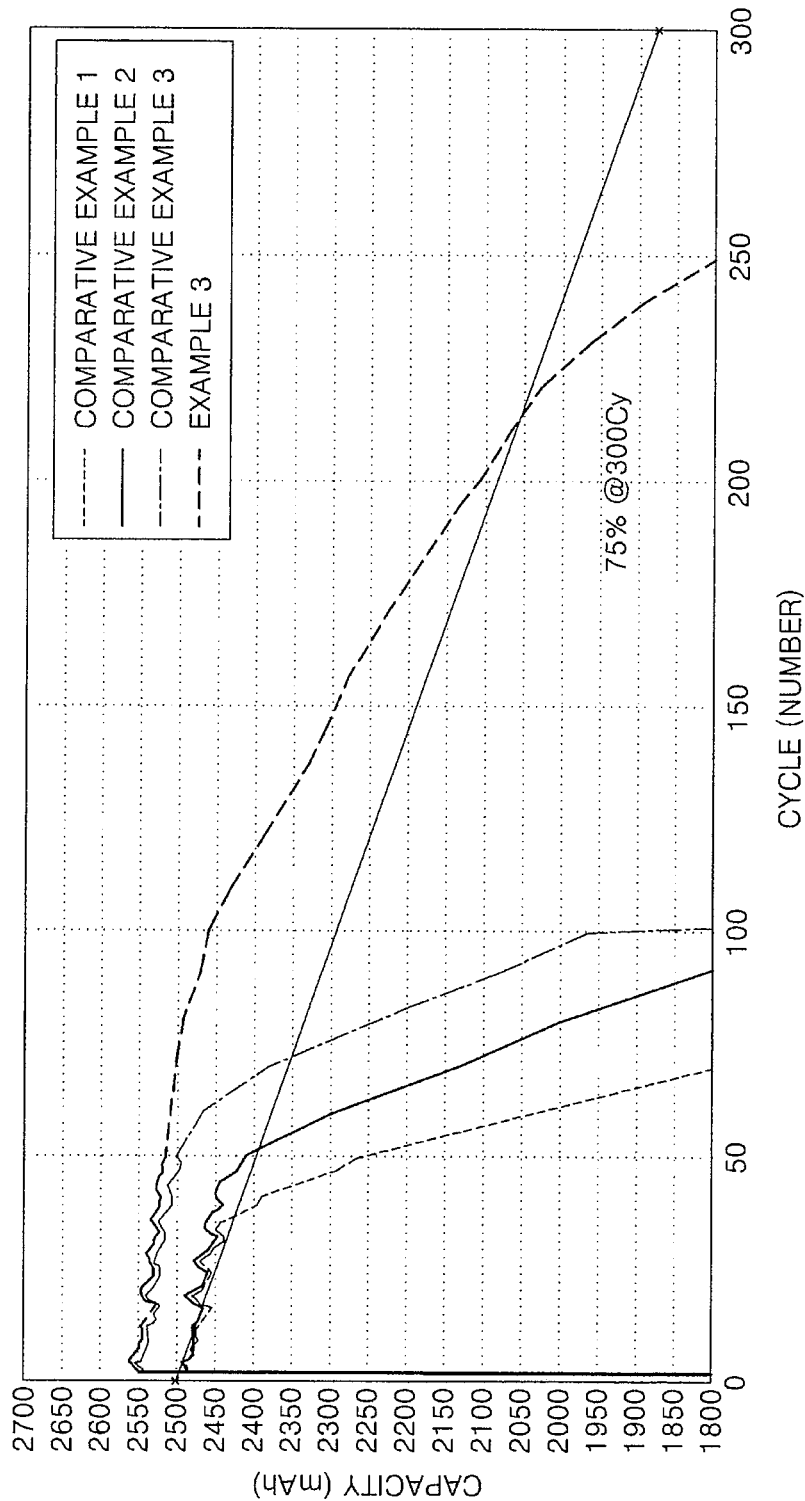
FIGS. 2 through 4 are graphs illustrating cycle-capacity characteristics of lithium batteries according to Examples 1 and 3-5 and Comparative Examples 1-4 and 7-16.
Figure 3:
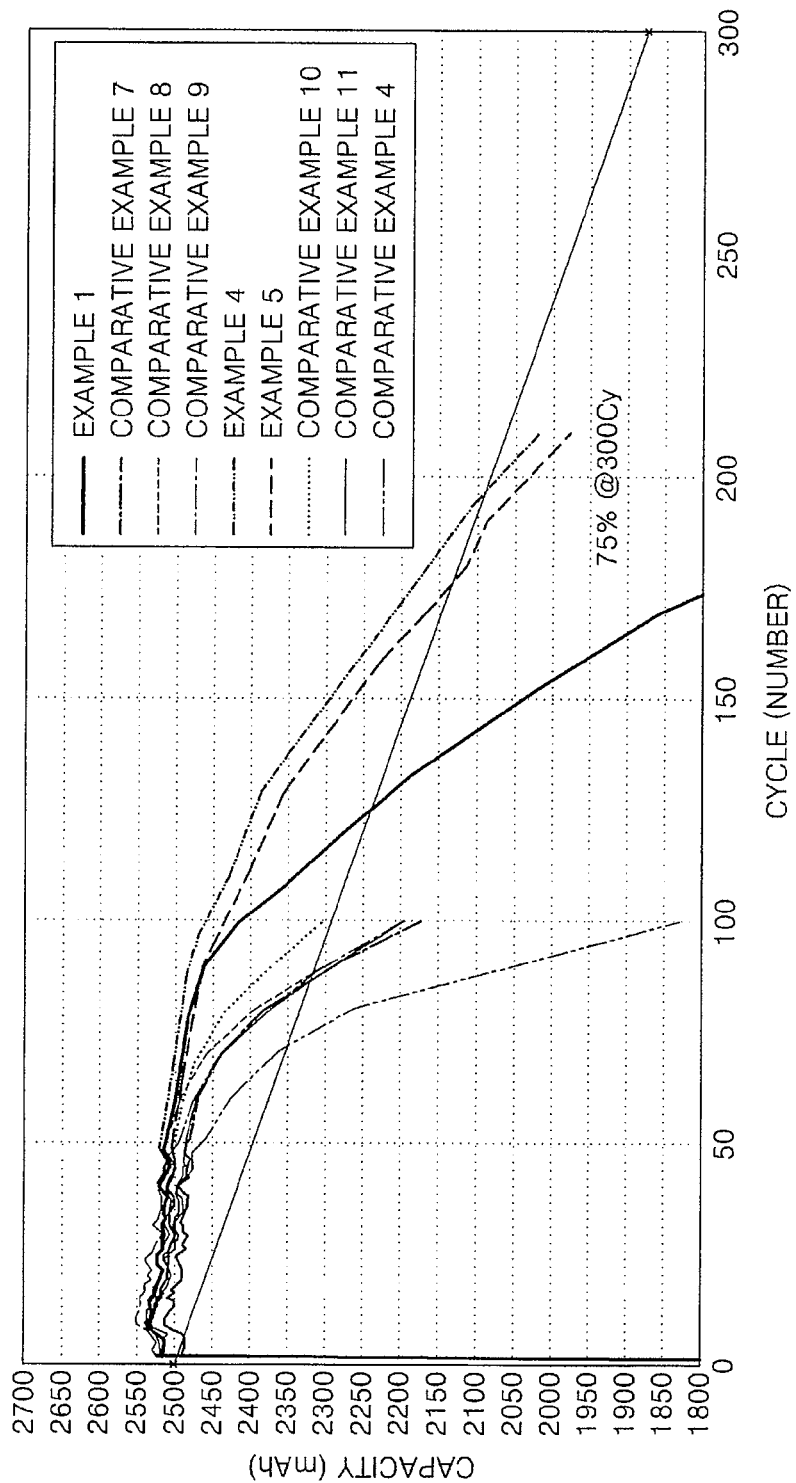
Figure 4:
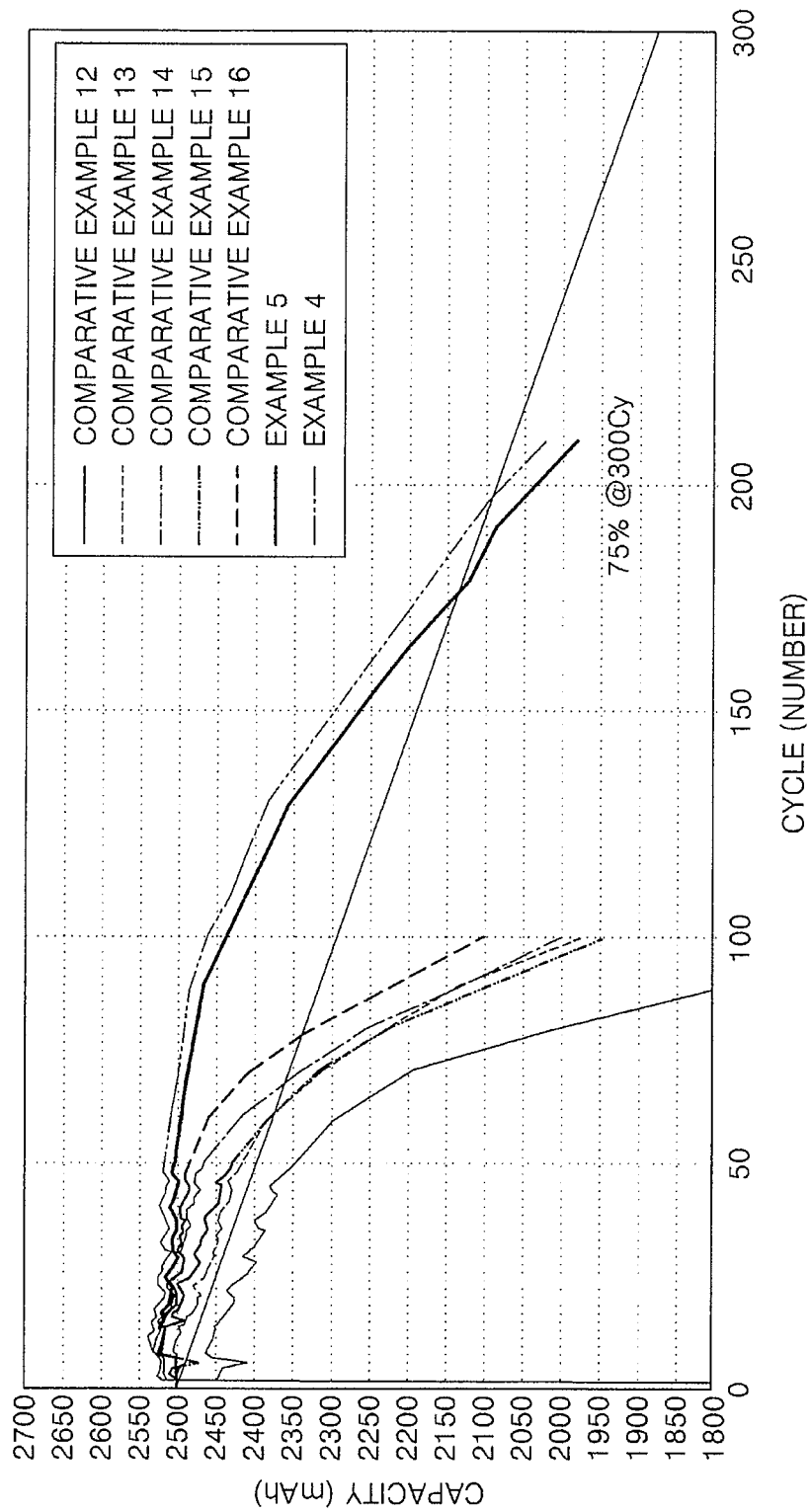

The results of the evaluation of room temperature-lifetime performance are shown in Table 1 and FIGS. 2 through 4.

TABLE 1

| | Nonaqueous organic solvent (unit: parts by volume) | | | | cycle of sharp capacity decline | capacity after 100 cycles (mAh) | Room temperature (25° C.)-lifetime performance | |
|---|---|---|---|---|---|---|---|---|
| | | | | | | | 100 cycles-capacity retention rate with respect to initial capacity (%) | 100 cycles-capacity retention rate with respect to 2,600 mAh (%) |
| | EC | EMC | DMC | DEC | | | | |
| Comparative Example 1 | 50 | 20 | 30 | 0 | 31 | 655 | 26 | 25 |
| Comparative Example 2 | 40 | 20 | 40 | 0 | 50 | 1577 | 64 | 61 |
| Comparative Example 3 | 30 | 20 | 50 | 0 | 55 | 1961 | 77 | 75 |
| Comparative Example 4 | 10 | 90 | 0 | 0 | 48 | 1828 | 73 | 70 |
| Comparative Example 5 | 10 | 60 | 30 | 0 | 50 | 1645 | 65 | 66 |
| Comparative Example 6 | 10 | 40 | 50 | 0 | 55 | 1698 | 67 | 68 |
| Comparative Example 7 | 20 | 40 | 40 | 0 | 60 | 2171.639 | 87 | 84 |
| Comparative Example 8 | 20 | 60 | 20 | 0 | 60 | 2196.277 | 87 | 84 |
| Comparative Example 9 | 20 | 80 | 0 | 0 | 60 | 2192.305 | 87 | 84 |
| Comparative Example 10 | 10 | 50 | 40 | 0 | 70 | 2302.434 | 92 | 89 |
| Comparative Example 11 | 10 | 70 | 20 | 0 | 60 | 2195.679 | 87 | 84 |
| Comparative Example 12 | 20 | 20 | 0 | 60 | 60.0 | 1519.816 | 62 | 58 |

TABLE 1-continued

|  | Nonaqueous organic solvent (unit: parts by volume) | | | | cycle of sharp capacity decline | capacity after 100 cycles (mAh) | Room temperature (25° C.)-lifetime performance | |
|---|---|---|---|---|---|---|---|---|
|  | EC | EMC | DMC | DEC |  |  | 100 cycles-capacity retention rate with respect to initial capacity (%) | 100 cycles-capacity retention rate with respect to 2,600 mAh (%) |
| Comparative Example 13 | 20 | 40 | 0 | 40 | 60.0 | 1968.732 | 79 | 76 |
| Comparative Example 14 | 20 | 60 | 0 | 20 | 60.0 | 1993.666 | 79 | 77 |
| Comparative Example 15 | 20 | 0 | 20 | 60 | 60 | 1939.503 | 78 | 75 |
| Comparative Example 16 | 20 | 0 | 40 | 40 | 60 | 2099.463 | 84 | 81 |
| Example 1 | 20 | 0 | 80 | 0 | 100 | 2413 | 96 | 93 |
| Example 2 | 20 | 20 | 60 | 0 | 100 | 2310 | 92 | 90 |
| Example 3 | 10 | 20 | 70 | 0 | 110 | 2460 | 97 | 95 |
| Example 4 | 10 | 10 | 80 | 0 | 130 | 2462 | 98 | 95 |
| Example 5 | 10 | 30 | 60 | 0 | 100 | 2437 | 97 | 94 |
| Example 6 | 20 | 0 | 60 | 20 | 100 | 2413 | 96 | 93 |

Referring to Table 1 and FIGS. 2 through 4, in the lithium batteries manufactured according to Examples 1 through 6, the time at which the capacity sharply declined was delayed, and capacity retention rates were excellent compared to the lithium batteries prepared according to Comparative Examples 1 through 16.

As described above, according to the one or more of the above embodiments of the present invention, a lithium battery including the electrolytic solution prepared as described above for a lithium battery including a positive electrode containing a Ni—Co—Mn-based active material has high capacity and long lifetime despite being charged to a high voltage.

While the present invention has been described in connection with certain exemplary embodiments, it is understood by those of ordinary skill in the art that certain modifications may be made to the described embodiments without departing from the spirit and scope of the present invention, as defined by the appended claims and their equivalents.

What is claimed is:

1. A lithium battery comprising:
a positive electrode comprising a Ni—Co—Mn based active material;
a negative electrode; and
an electrolytic solution comprising a nonaqueous organic solvent and a lithium salt,
wherein the nonaqueous organic solvent comprises a positive amount of ethylene carbonate (EC) at equal to or less than 20 parts by volume based on 100 parts by volume of the nonaqueous organic solvent and dimethyl carbonate (DMC) at equal to or greater than 60 parts by volume based on 100 parts by volume of the nonaqueous organic solvent, and wherein the Ni—Co—Mn based active material is $LiNi_{0.5}Co_{0.2}Mn_{0.3}O_2$.

2. The lithium battery of claim 1, wherein the positive electrode further comprises a $LiCoO_2$ active material.

3. The lithium battery of claim 1, wherein the EC is in the range of about 10 parts by volume to about 20 parts by volume based on 100 parts by volume of the nonaqueous organic solvent.

4. The lithium battery of claim 1, wherein the DMC is in the range of about 60 parts by volume to about 90 parts by volume based on 100 parts by volume of the nonaqueous organic solvent.

5. The lithium battery of claim 1, wherein the DMC is in the range of about 60 parts by volume to about 80 parts by volume based on 100 parts by volume of the nonaqueous organic solvent.

6. The lithium battery of claim 1, wherein the nonaqueous organic solvent further comprises at least one first material selected from the group consisting of ethylmethyl carbonate (EMC) and diethyl carbonate (DEC).

7. The lithium battery of claim 6, wherein the first material is equal to or less than 30 parts by volume based on 100 parts by volume of the nonaqueous organic solvent.

8. The lithium battery of claim 1, wherein a final charge voltage is equal to or greater than 4.25 V.

9. A method of operating a lithium battery, the method comprising:
providing a lithium battery comprising a positive electrode comprising a Ni—Co—Mn based active material, a negative electrode, and an electrolytic solution comprising a nonaqueous organic solvent and a lithium salt, the nonaqueous organic solvent comprising ethylene carbonate (EC) at equal to or less than 20 parts by volume based on 100 parts by volume of the nonaqueous organic solvent and dimethyl carbonate (DMC) at equal to or greater than 60 parts by volume based on 100 parts by volume of the nonaqueous organic solvent; and
charging the lithium battery to have a charge cut-off voltage equal to or greater than 4.25 V,
wherein the Ni—Co—Mn based active material is $LiNi_{0.5}Co_{0.2}Mn_{0.3}O_2$.

* * * * *